(12) United States Patent
Axe et al.

(10) Patent No.: US 12,140,064 B1
(45) Date of Patent: Nov. 12, 2024

(54) LOW TEMPERATURE DIESEL AFTERTREATMENT REGENERATION STRATEGY

(71) Applicant: GM Global Technology Operations LLC, Detroit, MI (US)

(72) Inventors: Bryan D. Axe, Farmington Hills, MI (US); Sarah Funk, Canton, MI (US); Eric Darvin Thomas, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/654,370

(22) Filed: May 3, 2024

(51) Int. Cl.
| | |
|---|---|
| *F01N 3/20* | (2006.01) |
| *B01D 46/82* | (2022.01) |
| *B01D 53/94* | (2006.01) |
| *F01N 3/023* | (2006.01) |
| *F01N 3/10* | (2006.01) |
| *F01N 3/28* | (2006.01) |
| *F01N 13/00* | (2010.01) |
| *F02D 41/00* | (2006.01) |
| *F02D 41/02* | (2006.01) |
| *F02D 41/40* | (2006.01) |

(52) U.S. Cl.
CPC ............ *F01N 3/208* (2013.01); *B01D 46/82* (2022.01); *B01D 53/9422* (2013.01); *B01D 53/944* (2013.01); *B01D 53/9477* (2013.01); *B01D 53/9495* (2013.01); *F01N 3/023* (2013.01); *F01N 3/106* (2013.01); *F01N 3/2006* (2013.01); *F01N 3/2803* (2013.01); *F01N 13/009* (2014.06); *F02D 41/005* (2013.01); *F02D 41/029* (2013.01); *F02D 41/405* (2013.01); *B01D 2255/1021* (2013.01); *B01D 2255/1023* (2013.01); *B01D 2257/302* (2013.01); *B01D 2257/404* (2013.01); *B01D 2258/012* (2013.01); *F01N 2370/02* (2013.01); *F01N 2610/02* (2013.01); *F01N 2610/1453* (2013.01); *F01N 2900/1404* (2013.01); *F01N 2900/1406* (2013.01); *F01N 2900/1606* (2013.01)

(58) Field of Classification Search
CPC ......... F01N 3/208; F01N 3/023; F01N 13/009
See application file for complete search history.

(56) References Cited

U.S. PATENT DOCUMENTS

2022/0025803 A1\* 1/2022 Webb ................. B01D 53/9495

FOREIGN PATENT DOCUMENTS

WO    WO-2013095214 A1 \*  6/2013   ......... B01D 53/9431

\* cited by examiner

*Primary Examiner* — Ngoc T Nguyen
(74) *Attorney, Agent, or Firm* — Vivacqua Crane, PLLC (57) ABSTRACT

A method of aftertreatment regeneration includes routing exhaust gases from a diesel engine through an exhaust system and initiating a nitrogen dioxide based aftertreatment regeneration of a diesel particulate filter (DPF) by at least partially de-activating a first DEF injector and an upstream selective catalyst reducer (SCR), increasing levels of Nitric Oxide within exhaust gas from the engine, establishing and maintaining an target exhaust gas temperature at an inlet of the DPF by actively controlling combustion characteristics of the engine, converting, with a diesel oxidation catalyst, (DOC) NO within the exhaust gas entering the DOC to NO2, and converting solid carbon-based particulate matter that has accumulated within the DPF to gaseous carbon dioxide (CO2) and NO by using NO2 as an oxidant.

20 Claims, 2 Drawing Sheets

LOW TEMPERATURE DIESEL AFTERTREATMENT REGENERATION STRATEGY

INTRODUCTION

The present invention relates generally to a control strategy for aftertreatment regeneration of an exhaust system for an internal combustion engine. Aftertreatment devices of diesel exhaust systems such as the diesel oxidation catalyst (DOC), the diesel particulate filter (DPF), the lean NOx trap (LNT), and the selective catalytic reduction (SCR) have become indispensable. Oxygen based regeneration of DPFs operate at very high temperatures, causing pre-mature "aging" of the components of the DPF and the SCR, and other components of the exhaust system due to thermal degradation.

Thus, there is a need for an improved system and method for providing aftertreatment regeneration of the DPF and SCR for a diesel exhaust system including, primarily using an NO2 based aftertreatment regeneration of the DPF, occasionally, when soot reduction within the DPF is ineffective during an NO2 based aftertreatment regeneration, using a short-term O2 based aftertreatment regeneration of the DPF, and occasionally, when no recent O2 based aftertreatment regeneration has been initiated, using an SCR desulfation.

SUMMARY

According to several aspects of the present disclosure, a method of aftertreatment regeneration in a diesel vehicle includes routing exhaust gases from a diesel engine through an exhaust system within the vehicle, the exhaust system including a diesel oxidizing catalyst (DOC) located immediately downstream of the diesel engine, an upstream selective catalytic reduction (SCR) unit located downstream of the DOC, a first diesel exhaust fluid (DEF) injector positioned between the DOC and the first SCR and adapted to inject DEF into the exhaust gas, a diesel particulate filter (DPF) positioned downstream of the first SCR and adapted to collect particulate material from exhaust gas passing therethrough, and an exhaust system controller in communication with an engine controller, a plurality of sensors within the exhaust system and the first DEF injector, and initiating a nitrogen dioxide (NO2) based aftertreatment regeneration of the DPF by at least partially de-activating, with the exhaust system controller, the first DEF injector and the upstream SCR, such that NO2 is allowed to pass through the upstream SCR, increasing, with the exhaust system controller via communication with the engine controller, levels of Nitric Oxide (NO) within exhaust gas from the engine, establishing and maintaining an target exhaust gas temperature (EGT) at an inlet of the DPF (DPF inlet temperature) and an target EGT at an inlet of the DOC (DOC inlet temperature) by actively controlling, with the exhaust system controller, via communication with the engine controller, combustion characteristics of the engine, converting, with the DOC, NO within the exhaust gas entering the DOC to NO2, and converting solid carbon-based particulate matter that has accumulated within the DPF to gaseous carbon dioxide (CO2) and NO by using NO2 as an oxidant.

According to another aspect, the increasing, with the exhaust system controller via communication with the engine controller, levels of NO within exhaust gas from the engine further includes selectively adjusting utilization, with the exhaust system controller, via communication with the engine controller, of an exhaust gas recirculation (EGR) unit, injection timing, injection quantity, and fresh air quantity within the engine.

According to another aspect, the establishing and maintaining an target exhaust gas temperature (EGT) at an inlet of the DPF (DPF inlet temperature) and an target EGT at an inlet of the DOC (DOC inlet temperature) by actively controlling, with the exhaust system controller, via communication with the engine controller, combustion characteristics of the engine further includes calculating, an target EGT of exhaust gas coming from the engine based on the target DPF inlet temperature and the target DOC inlet temperature and thermodynamic characteristics of the exhaust system, and establishing and maintaining the target EGT of exhaust gas coming from the engine and the target EGT of exhaust gas coming from the DOC by selectively utilizing, with the exhaust system controller, via communication with the engine controller, late injections and post injections within the engine.

According to another aspect, the establishing and maintaining an target exhaust gas temperature (EGT) at an inlet of the DPF (DPF inlet temperature) further includes establishing and maintaining the DPF inlet temperature between approximately three-hundred degrees Celsius and approximately five-hundred degrees Celsius.

According to another aspect, the converting, with the DOC, NO within the exhaust gas entering the DOC to NO2 further includes, converting, with the DOC, using platinum as a catalyst, NO within the exhaust gas entering the DOC to NO2.

According to another aspect, the at least partially de-activating, with the exhaust system controller, the first DEF injector and the upstream SCR, such that NO2 is allowed to pass through the upstream SCR further includes, prior to the increasing levels of NO within exhaust gas from the engine, establishing and maintaining an target DPF inlet temperature and an target DOC inlet temperature, and converting, with the DOC, NO within the exhaust gas entering the DOC to NO2, at least partially de-activating, with the exhaust system controller, the first DEF injector, and allowing residual DEF within the upstream SCR to dissipate to acceptable levels.

According to another aspect, the converting solid carbon-based particulate matter that has accumulated within the DPF to gaseous carbon dioxide (CO2) and NO by using NO2 as an oxidant further includes exposing carbon particulate matter within the DPF to at least one of a platinum and a palladium catalyst, wherein, the carbon particulate matter and the NO2 react to form CO2 and NO, and further wherein, the NO reacts with oxygen (O2) to form NO2, wherein the newly formed NO2 further reacts with carbon particulate matter.

According to another aspect, the method further includes monitoring, with the exhaust system controller, via communication with a delta pressure sensor and a temperature of the exhaust gas within the DPF, a level of carbon particulate matter within the DPF, and initiating a short-term O2 based aftertreatment regeneration of the DPF when one of a level of particulate matter within the DPF increases during an NO2 based aftertreatment regeneration, or, the level of particulate matter within the DPF is decreasing slower than a predetermined rate during an NO2 based aftertreatment regeneration.

According to another aspect, the initiating a short term O2 based aftertreatment regeneration of the DPF further includes managing the level of O2 within exhaust gas at the DPF inlet by controlling, with the exhaust system controller via communication with the engine controller, levels of O2 within exhaust gas from the engine by selectively adjusting utilization, with the exhaust system controller, via communication with the engine controller, of the EGR unit, injection timing, injection quantity, and fresh air quantity within the engine, establishing and maintaining a desired EGT of between approximately five-hundred degrees Celsius and six-hundred and fifty degrees Celsius at the inlet of the DPF by calculating, an target EGT of exhaust gas coming from the engine and an target EGT of exhaust gas coming from the DOC based on the desired EGT at the DPF inlet and the thermodynamic characteristics of the exhaust system, and, establishing and maintaining the target EGT of exhaust gas coming from the engine and the target EGT of exhaust gas coming from the DOC by actively controlling, with the exhaust system controller, via communication with the engine controller, combustion characteristics of the engine and selectively utilizing, with the exhaust system controller, via communication with the engine controller, late injections and post injections within the engine, and converting solid carbon-based particulate matter that has accumulated within the DPF to gaseous $CO_2$ by using $O_2$ as an oxidant.

According to another aspect, the method further includes initiating a short-term SCR desulfation and desorbing sulfur oxides (SOx) within the upstream SCR, the short-term SCR desulfation including establishing and maintaining an target desorbing EGT at an inlet of the upstream SCR by calculating, an target EGT of exhaust gas coming from the engine and an target EGT of exhaust gas coming from the DOC based on the target desorbing EGT and the thermodynamic characteristics of the exhaust system, and establishing and maintaining the target EGT of exhaust gas coming from the engine and the target EGT of exhaust gas coming from the DOC by actively controlling, with the exhaust system controller, via communication with the engine controller, combustion characteristics of the engine and selectively utilizing, with the exhaust system controller, via communication with the engine controller, late injections and post injections within the engine.

According to several aspects of the present disclosure, and exhaust system for a vehicle having a diesel engine includes a diesel oxidizing catalyst (DOC) located immediately downstream of the diesel engine, an upstream selective catalytic reduction (SCR) unit located downstream of the DOC, a first diesel exhaust fluid (DEF) injector positioned between the DOC and the upstream SCR and adapted to inject DEF into the exhaust gas, a diesel particulate filter (DPF) positioned downstream of the upstream SCR and adapted to collect particulate material from exhaust gas passing therethrough, and an exhaust system controller in communication with an engine controller, a plurality of sensors within the exhaust system and the first DEF injector, and wherein, the exhaust system controller is adapted to initiate a nitrogen dioxide ($NO_2$) based aftertreatment regeneration of the DPF, wherein the exhaust system controller is adapted to at least partially de-activate the first DEF injector and the upstream SCR, such that $NO_2$ is allowed to pass through the upstream SCR, increase, via communication with the engine controller, levels of Nitric Oxide (NO) within exhaust gas from the engine, establish and maintaining an target exhaust gas temperature (EGT) at an inlet of the DPF (DPF inlet temperature) and an target EGT at an inlet of the DOC (DOC inlet temperature) by actively controlling, via communication with the engine controller, combustion characteristics of the engine, wherein, the DOC is adapted to convert NO within the exhaust gas entering the DOC to $NO_2$, solid carbon-based particulate matter that has accumulated within the DPF is converted to gaseous carbon dioxide ($CO_2$) and NO by using $NO_2$ as an oxidant.

According to another aspect, to increase levels of NO within exhaust gas from the engine, the exhaust system controller is further adapted to, via communication with the engine controller, selectively adjust utilization of an exhaust gas recirculation (EGR) unit, injection timing, injection quantity, and fresh air quantity within the engine.

According to another aspect, to establish and maintaining an target exhaust gas temperature (EGT) at the inlet of the DPF and an target EGT at the inlet of the DOC, the exhaust system controller is further adapted to calculate an target EGT of exhaust gas coming from the engine and an target EGT of exhaust gas coming from the DOC based on the target DPF inlet temperature thermodynamic characteristics of the exhaust system, and establish and maintain the target EGT of exhaust gas coming from the engine and the target EGT of exhaust gas coming from the DOC by selectively utilizing, via communication with the engine controller, late injections and post injections within the engine, and wherein the target EGT at the inlet of the DPF is between approximately three-hundred degrees Celsius and approximately five-hundred degrees Celsius.

According to another aspect, the DOC includes a platinum catalyst and is adapted to convert NO within the exhaust gas entering the DOC to $NO_2$.

According to another aspect, to at least partially de-activate the first DEF injector and the upstream SCR, such that $NO_2$ is allowed to pass through the upstream SCR, the exhaust system controller is further adapted to, prior to increasing levels of NO within exhaust gas from the engine, establishing and maintaining the target DPF inlet temperature and the target DOC inlet temperature, and conversion, within the DOC, NO within the exhaust gas entering the DOC to $NO_2$, at least partially de-activate the first DEF injector, and allow residual DEF within the upstream SCR to dissipate.

According to another aspect, the DPF includes at least one of a platinum and a palladium catalyst, wherein when carbon particulate matter within the DPF is exposed to the at least one of platinum and palladium catalyst, the carbon particulate matter and the $NO_2$ react to form $CO_2$ and NO, and the NO reacts with oxygen ($O_2$) to form $NO_2$, wherein the newly formed $NO_2$ further reacts with carbon particulate matter.

According to another aspect, the exhaust system controller is further adapted to monitor, via communication with a delta pressure sensor and input from temperature sensors within the system, a level of carbon particulate matter within the DPF, and, initiate a short-term $O_2$ based aftertreatment regeneration of the DPF when one of a level of particulate matter within the DPF increases during an $NO_2$ based aftertreatment regeneration, or the level of particulate matter within the DPF is decreasing slower than a predetermined rate during an $NO_2$ based aftertreatment regeneration.

According to another aspect, when initiating a short term $O_2$ based aftertreatment regeneration of the DPF, the exhaust system controller is further adapted to manage the level of $O_2$ within exhaust gas at the DPF inlet by controlling, via communication with the engine controller, levels of $O_2$ within exhaust gas from the engine by selectively adjusting utilization of the EGR unit, injection timing, injection quantity, and fresh air quantity within the engine, calculate an target EGT of exhaust gas coming from the engine and an target EGT of exhaust gas coming from DOC based on a desired EGT at the DPF inlet of between approximately five-hundred degrees Celsius and six-hundred and fifty degrees Celsius and the thermodynamic characteristics of the exhaust system, and utilize, via communication with the engine controller, selective late injections and post injections within the engine to actively control combustion characteristics of the engine to establish and maintain the target EGT of exhaust gas coming from the engine and the target EGT of exhaust gas coming from DOC, and wherein, solid carbon-based particulate matter that has accumulated within the DPF is converted to gaseous CO2 by using O2 as a reductant.

According to another aspect, the exhaust system controller is further adapted to initiate a short-term SCR desulfation for desorbing sulfur oxides (SOx) within the upstream SCR, wherein the exhaust system controller is adapted to calculate an target EGT of exhaust gas coming from the engine and an target EGT of exhaust gas coming from DOC based on an target desorbing EGT at an inlet of the upstream SCR and the thermodynamic characteristics of the exhaust system, actively control, via communication with the engine controller, combustion characteristics of the engine and selectively utilize late injections and post injections within the engine to establish and maintain the target desorbing EGT at the inlet of the upstream SCR.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components. As used herein, the term "approximately", when referring to temperatures means plus/minus twenty-five degrees, and when referring to percentages means plus/minus twenty percent.

Diesel engines are widely used in road transportation and non-road machinery due to their higher thermal efficiency, better torque performance, and greater reliability compared to internal combustion engines using other fossil fuels. Despite the increase of electrification and hybridization in light-duty vehicles, diesel engines continue to play a dominant role in many industries. Diesel engines have high levels of nitrogen oxides (NOx) and particulate matter (PM) in emissions due to diffusion combustion, and there is a tradeoff relationship between these emissions. The tradeoff makes emissions reduction of diesel engines challenging. As energy conservation and environmental pollution issues become more prominent, regulations on fuel consumption and emissions control for diesel engines have been implemented worldwide. These regulations have exerted a great pressure to the diesel engine industry and promoted technology innovation. To achieve the goals of energy savings and emissions reduction, many in-cylinder purification technologies such as high-pressure fuel injection, multiple injections, variable geometry turbocharging (VGT), two-stage turbocharging, and exhaust gas recirculation (EGR) have been developed for diesel engines. Nevertheless, these in-cylinder technologies are not sufficient to meet today's stringent emissions requirements. Therefore, aftertreatment devices such as the diesel oxidation catalyst (DOC), the diesel particulate filter (DPF), the lean NOx trap (LNT), and the selective catalytic reduction (SCR) have become indispensable. This technology can also be implemented for aftertreatment regeneration in exhaust systems for gasoline engines. While terminology herein is directed toward diesel engines and diesel exhaust systems, it should be understood by those skilled in the art that the novel features of the present disclosure are applicable to gasoline powered internal combustion engines.

Diesel particulate filters allow exhaust gases to pass through while trapping solid particulate matter. To eliminate the buildup of such trapped particulate matter, many diesel exhaust systems incorporate an oxygen-based aftertreatment regeneration within the DPF, wherein the level of oxygen (O2) within the exhaust gases from the engine, and running through the DPF, is managed, and the temperature of the exhaust gas from the engine, and running through the DPF, is increased, triggering a spontaneous reaction between the particulate matter (Carbon, C) and oxygen within the DPF, converting the solid carbon particulate matter to CO2 gas, which can then pass though the DPF and the exhaust system, as per Equation 1.

$$C + O_2 \rightarrow CO_2 \qquad \text{Equation 1:}$$

A drawback to such systems is that when using O2 as a oxidant, the temperature needed to sustain the chemical reaction is very high, in the range of approximately Five-Hundred degrees Celsius to Six-Hundred Fifty degrees Celsius. Regeneration performance is a function of both soot (carbon particulate matter) load and temperature. The performance is linearly proportional to the soot load and exponentially proportional to the temperature. Consistent operation of such aftertreatment, at such temperatures, causes pre-mature "aging" of the components of the DPF, and other components of the exhaust system, especially, the SCR. Simply stated, operating at such elevated temperatures causes deterioration of the SCR, the DPF and other components of the exhaust system that may cause emissions deterioration over time. Thus, there is a need for an improved system and method for providing aftertreatment regeneration of the DPF and SCR for a diesel exhaust system.

Figure 1:
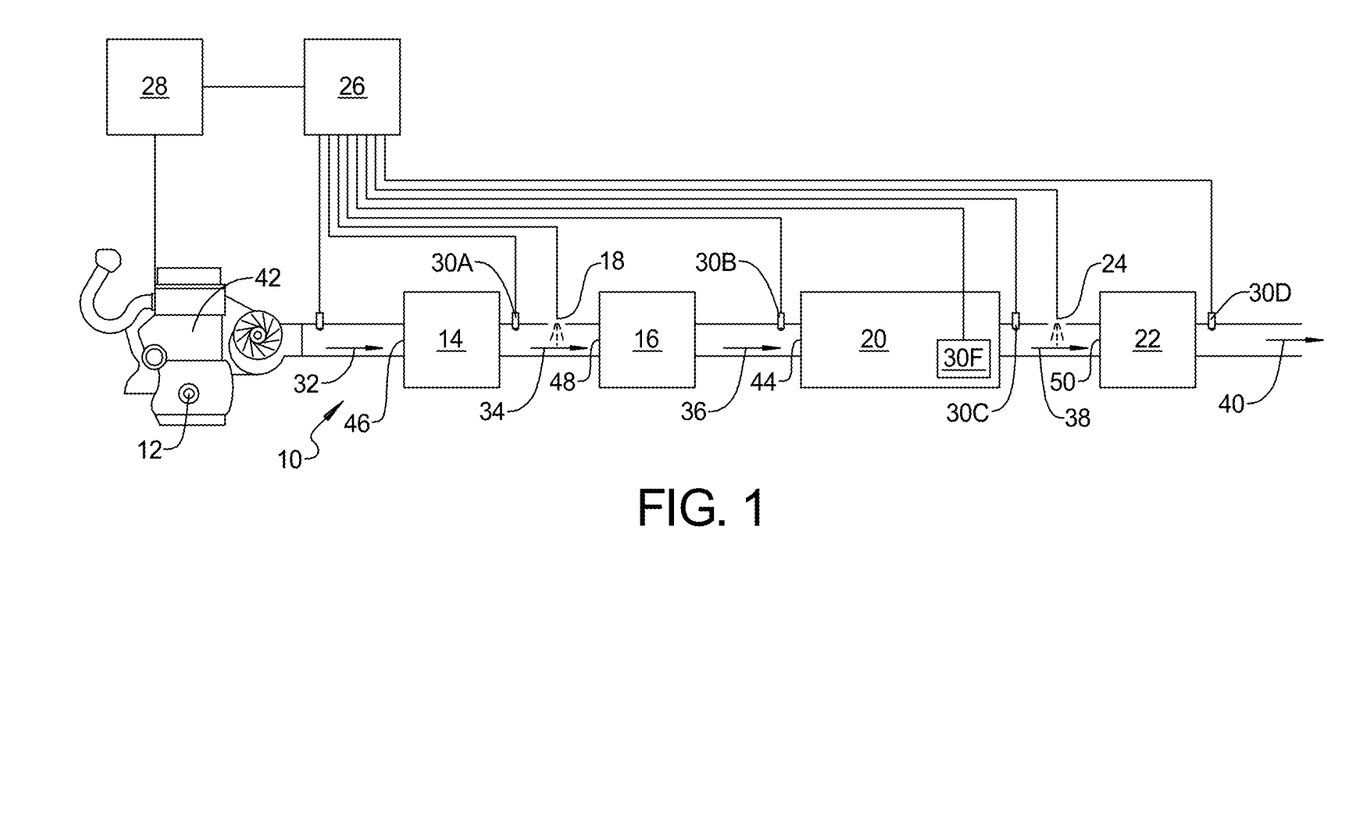
FIG. 1 is a schematic diagram of a system according to an exemplary embodiment of the present disclosure.

Referring to FIG. 1, according to aspects of the present disclosure, a diesel exhaust system 10 for a vehicle equipped with a diesel engine 12 includes a diesel oxidizing catalyst (DOC) 14 located immediately downstream of the diesel engine 12, an upstream selective catalytic reduction unit (SCR) 16 located downstream of the DOC 14, a first diesel exhaust fluid (DEF) injector 18 positioned between the DOC 14 and the upstream SCR 16 and adapted to inject DEF into the exhaust gas, a diesel particulate filter (DPF) 20 positioned downstream of the upstream SCR 16 and adapted to collect particulate material from exhaust gas passing therethrough, a downstream SCR 22 located downstream of the DPF 20, a second DEF injector 24 positioned between the DPF 20 and the downstream SCR 22 and adapted to inject DEF into the exhaust gas, and an exhaust system controller 26 in communication with an engine controller 28, a plurality of sensors 30A-30F, and the first and second DEF injectors 18, 24.

The exhaust system controller 26 and the engine controller 28 are each a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

In an exemplary embodiment, the plurality of sensors 30A-30F includes, at least, a first temperature sensor 30A, adapted to monitor a temperature of the exhaust gas moving from the engine 12 to the DOC 14, as indicated by arrow 32, a second temperature sensor 30B, adapted to monitor a temperature of the exhaust gas moving from the DOC 14 to the upstream SCR 16, as indicated by arrow 34, a third temperature sensor 30C, adapted to monitor a temperature of the exhaust gas moving from the upstream SCR 16 to the DPF 20, as indicated by arrow 36, a fourth temperature sensor 30D, adapted to monitor a temperature of the exhaust gas moving from the DPF 20 to the downstream SCR 22, as indicated by arrow 38, a fifth temperature sensor 30E, adapted to monitor a temperature of the exhaust gas exiting the downstream SCR 22, as indicated by arrow 40, and a delta pressure sensor 30F within the DPF 20, adapted to monitor a level of particulate matter accumulated within the DPF 20. The plurality of sensors includes various other sensors included within the exhaust system 10 and positioned within the engine 12 as well as other sensors that are positioned within the vehicle and in communication with the exhaust system controller 26.

In an exemplary embodiment, the exhaust system controller 26 is adapted to initiate a nitrogen dioxide (NO2) based aftertreatment regeneration of the DPF 20, when the level of particulate matter within the DPF 20 reaches a pre-determined particulate matter fill level that requires regeneration. The level of the particulate matter within the DPF 20 is monitored by the delta pressure sensor 30F. Initiation of the NO2 based aftertreatment regeneration is based on feedback from the delta pressure sensor 30F, and other information gathered by various ones of the plurality of sensors.

Known O2 based aftertreatment regeneration methods operate at temperatures between approximately five-hundred degrees Celsius and approximately six-hundred fifty degrees Celsius, whereas an NO2 based aftertreatment regeneration operates at lower temperatures of between approximately three-hundred degrees Celsius and approximately five-hundred degrees Celsius. Thus, an NO2 based aftertreatment regeneration does not thermally deteriorate the components of the exhaust system like an O2 based aftertreatment regeneration.

During an NO2 based aftertreatment regeneration within the DPF 20, the level of NO2 within the exhaust gases from the engine 12, and passing through the DPF 20, is increased, and the temperature of the exhaust gas from the engine 12, and passing through the DPF 20, is controlled, triggering a spontaneous reaction between the particulate matter (Carbon, C) and NO2 within the DPF 20, converting the solid carbon particulate matter to CO2 gas and nitric oxide (NO), which can then pass though the DPF 20 and the exhaust system, as per Equation 2.

$$C + 2NO_2 \rightarrow CO_2 + 2NO \qquad \text{Equation 2:}$$

To facilitate the spontaneous reaction within the DPF 20, the level of NO2 within the DPF 20 must be increased and the temperature of the exhaust gas within the DPF 20 must be established and maintained, however, any exhaust gas passing to the DPF 20 must first pass through the upstream SCR 16. The upstream SCR 16 is adapted to remove NO and NO2 from the exhaust gases passing therethrough, thus, to ensure that NO2 reaches the DPF 20, to initiate the NO2 based aftertreatment regeneration, the exhaust system controller 26 is adapted to at least partially de-activate the first DEF injector 18 and the first SCR 16 to control the performance of the first DEF injector 18 and the upstream SCR 16, such that sufficient NO2 is allowed to pass through the upstream SCR 16. If the first SCR is to be deactivated completely, this is a two-step process, wherein first, the exhaust system controller 26 de-activates the first DEF injector 18, stopping the injection of DEF (ammonia, NH3) and then, the exhaust system controller 26, prior to any further action, allows a pre-determined amount of time to pass to allow residual DEF within the upstream SCR 16 to dissipate. If the upstream SCR is to be partially deactivated, this is a two-step process, wherein first, the exhaust system controller 26 controls the rate of injection of DEF (ammonia, NH3) by the first DEF injector 18, and then, the exhaust system controller 26, prior to any further action, allows the level of ammonia within the upstream SCR 16 to dissipate to a level adapted to allow sufficient NO2 to pass through the upstream SCR 16. The ammonia within DEF fluid is adapted to consume NO and NO2, and thus, levels of ammonia within the upstream SCR 16 must be controlled during initiation of an NO2 based aftertreatment regeneration. In some instances it may not be necessary to completely deactivate the first DEF injector 18 and the upstream SCR 16, merely controlling performance of the first DEF injector 18 and the upstream SCR 16 such that a controlled amount of ammonia is present within the upstream SCR 16, and thus controlling the conversion of NO/NO2 that is taking place within the upstream SCR 16 and ensuring sufficient NO2 reaches the DPF 20.

After the first DEF injector 18 and the upstream SCR 16 have been neutralized, the exhaust system controller 26 is further adapted to increase, via communication with the engine controller 28, levels of Nitric Oxide (NO) within exhaust gas from the engine 12. The DOC 14 is adapted to convert the NO within the exhaust gas to NO2, which then propagates to the DPF 20, wherein the NO2 is used as a reductant for the NO2 based aftertreatment regeneration.

In an exemplary embodiment, to increase levels of NO within exhaust gas from the engine 12, the exhaust system controller 26 is further adapted to, via communication with the engine controller 28, selectively adjust utilization of an exhaust gas recirculation (EGR) unit 42, injection timing, injections quantity, and fresh air quantity within the engine 12. The exhaust system controller 26, via communication with the engine controller 28, will selectively adjust utilization of all components and methods used within the engine 12 that are adapted to reduce the levels of NOx within engine exhaust to increase the level of NO in the engine exhaust.

A known method for reducing NOx emissions is exhaust gas recirculation. This involves recirculating a controllable proportion of the engine's exhaust back into the intake air. A valve is usually used to control the flow of gas, and the valve may be closed completely if required. The substitution of burnt gas (which takes no further part in combustion) for oxygen rich air reduces the proportion of the cylinder contents available for combustion. This causes a correspondingly lower heat release and peak cylinder temperature, and reduces the formation of NOx. The gas to be recirculated may also be passed through an EGR cooler, which is usually of the air/water type. This reduces the temperature of the gas, which reduces the cylinder charge temperature when the EGR unit 42 is utilized. This has two effects, first, the reduction of charge temperature results in lower peak temperature, and, second, the greater density of cooled EGR gas allows a higher proportion of EGR to be used. On a diesel engine the recirculated fraction may be as high as fifty percent under some operating conditions. Whereas use of the EGR unit 42 is known to reduce the amount of NO within exhaust gas coming from the engine 12, by actively controlling the EGR utilization, the exhaust system controller 26 can reduce or eliminate utilization of the EGR unit 42 to increase the amount of NO within the exhaust gas coming from the engine 12.

By way of non-limiting example, and for purposes of explanation, in a hypothetical engine 12 initiating a hypothetical NO2 based aftertreatment regeneration within the DPF 20, the level of NO within exhaust gases coming from the engine are increase to 600 parts per million (PPM) of NO, wherein 600 ppm is a completely random number, used herein strictly for purposes of illustration and description The DOC 14, using platinum and oxygen, coverts NO within the exhaust gas from the engine 12 to NO2, and the DPF 20 converts carbon particulate within the DPF 20 to CO2 and NO, as per Equation 2 above within DPF using the NO2 within the exhaust gas from the DOC (passing through the upstream SCR 16) as the oxidant. However, for the chemical reactions shown in Equation 1 and Equation 2 to occur, the temperature within the DOC 14 and the DPF 20 must be at target temperatures.

In an exemplary embodiment, the exhaust system controller 26 is further adapted to establish and maintain an target exhaust gas temperature (EGT) at an inlet 44 of the DPF 20 (DPF inlet temperature) and an target EGT at an inlet 46 of the DOC 14 (DOC inlet temperature) by actively controlling, via communication with the engine controller 28, combustion characteristics of the engine 12. The DPF inlet temperature is monitored by the third temperature sensor 30C and the DOC inlet temperature is monitored by the first temperature sensor 30A. In an exemplary embodiment, the target EGT at the inlet 44 of the DPF 20 is as low as three hundred degrees Celsius (between approximately three-hundred degrees Celsius and approximately five-hundred degrees Celsius), as discussed above, to provide sufficient temperature to sustain the chemical reaction (Equation 2) of the NO2 based aftertreatment regeneration, while keeping temperature low enough to minimize thermal degradation ("aging") of the components within the exhaust system 10.

The primary factor affecting the temperature of the exhaust gas at any point within the exhaust system 10 is the temperature of the exhaust gas leaving the engine 12, which is the point at which the exhaust gas is at its' highest temperature, and thermal dynamic characteristics of the exhaust system 10, which determine how the exhaust gas cools as it travels through the exhaust system 10. Heat loss as exhaust gas passes from the engine 12 to the DOC 14, from the DOC 14 to the upstream SCR 16, from the upstream SCR 16 to the DPF 20, and from the DPF 20 to the downstream SCR 22 must be accounted for. Thus, the exhaust system controller 26 is further adapted to calculate an target EGT of exhaust gas coming from the engine 12 and more importantly, an target EGT of exhaust gas coming from the DOC 14, working backwards, based on the target DPF inlet temperature and thermodynamic characteristics of the exhaust system 10.

For example, based on the thermodynamics of the exhaust system 10, if the target target temperature within the DPF 20 (DPF inlet temperature), as measured by the third temperature sensor 300, that is needed to support the aftertreatment regeneration is four-hundred degrees Celsius, then the temperature within the upstream SCR 16, measured by the second temperature sensor 30B, must be four-hundred fifty degrees Celsius, and the temperature within the DOC 14 (DOC inlet temperature) must be five-hundred degrees Celsius.

In an exemplary embodiment, the exhaust system controller 26 is adapted to establish and maintain the target EGT of exhaust gas coming from the engine 12 and the target EGT of exhaust gas coming from the DOC 14 by selectively utilizing, via communication with the engine controller 28, late injections and post injections within the engine 12.

Late ignition timing is a known strategy for fast catalyst warm-up. Retarded combustion reduces work transfer from cylinder gases to the piston resulting in higher exhaust gas temperature. For constant engine torque, the reduced fuel conversion efficiency associated with late combustion requires greater fuel and air flow rate. Thus late ignition leads to greater engine-out sensible enthalpy flow due to both higher temperatures and greater mass flow rates.

Late fuel post-injections is a known strategy to provide closed-loop control of the exhaust gas temperature and reach high exhaust gas temperatures for aftertreatment regeneration of diesel particulate filters. Post-injection is an injection strategy in which a certain amount of fuel is injected after the main injection/combustion event to release heat after the main injection combustion event. This post-injected fuel is further cracked into small molecular hydrocarbons, then discharged from the cylinder and oxidized by the DOC 14 to release high temperature for aftertreatment regeneration within the DPF 20. This post-injected fuel can also improve combustion by oxidizing the previously generated soot, NOx, and decreasing particulate matter emissions. Fuel injected during an exhaust stroke of the engine cycle provides closed loop temperature control at the DOC 14 outlet. The temperature of exhaust gas exiting the engine 12 will generally be lower than the target DOC 14 temperature. The fuel injected during the exhaust stroke does not burn in the cylinder, but ignites inside the DOC 14, thereby generating heat and increasing the temperature of the exhaust gas coming from the engine 12 to the target EGT of exhaust gas coming from the DOC 14.

Thus, the exhaust system controller 26 maintains increased levels of NO within the exhaust gas coming from the engine and maintains target temperature at the DPF 20 and the DOC 14, wherein, the DOC 14 is adapted to convert NO within the exhaust gas entering the DOC 14 to NO2.

The DOC 14 primary functions are oxidation of CO, unburned hydrocarbons, and NO, while active hydrocarbon oxidation can also be used to generate exotherms required for downstream components. The DOC 14 promotes oxidation of exhaust gas components by oxygen, which is present in ample quantities in diesel exhaust. When passed over an oxidation catalyst, carbon monoxide (CO), gas phase hydrocarbons (HC), the organic fraction of diesel particulates (OF), as well as non-regulated emissions such as aldehydes or PAHs can be oxidized to harmless products, and thus can be controlled using the DOC 14. In the present system 10, an important function of the DOC 14 is, using platinum as a catalyst, to oxidize nitric oxide (NO) to nitrogen dioxide (NO2).

In an exemplary embodiment, the DOC 14 is adapted to convert approximately fifty percent of the NO within the exhaust gas entering the DOC 14 to NO2. The rate of conversion of NO to NO2 depends on many factors, and may be more or less than fifty percent, based on needs of the DPF 20 and the overall design of the system 10. Ultimately, the DOC 14 is designed to convert NO to NO2 at a rate that is sufficient to ensure an appropriate amount of NO2 reaches the DPF. Thus, referring to the non-limiting, hypothetical example given above, wherein the exhaust gas coming from the engine includes 600 ppm of NO, the DOC 14 will convert approximately half of the NO within the exhaust gas from the engine 12 to NO2, wherein the exhaust gas exiting the DOC 14 includes 300 ppm of NO and 300 ppm of NO2.

Within the DPF 20, when carbon particulate matter within the DPF is exposed to a platinum and/or palladium catalyst, the solid carbon-based particulate matter that has accumulated within the DPF 20 is converted to gaseous carbon dioxide (CO2) and NO by using the NO2 present within the exhaust gas as a oxidant for the NO2 based aftertreatment regeneration.

An added benefit of the NO2 based aftertreatment regeneration is that, once the chemical reaction (Equation 2) within the DPF begins, because of the presence of the platinum catalyst, the NO byproduct of Equation 2 further reacts with oxygen to form additional NO2, as indicated by Equation 3.

$$C+NO2 \rightarrow CO2+NO, \quad \text{Equation 2:}$$

$$NO+O2 \rightarrow NO2. \quad \text{Equation 3:}$$

Thus, once the chemical reaction of the NO2 based aftertreatment regeneration within the DPF 20 begins, the reaction of Equation 3 maintains the level of NO2 within the DPF to continue reacting with any remaining carbon particulate matter (soot) within the DPF 20 during the time the exhaust gas takes to pass through the DPF 20. Once the carbon particulate matter is dissipated and more NO2 is generated through the NO2 based aftertreatment regeneration within the DPF 20, the exhaust gas leaving the DPF 20 will have less NO and more NO2. Referring again to the non-limiting example wherein the exhaust gas coming from the DOC 14 includes 300 ppm NO and 300 ppm NO2, after passing through the DPF 20, the exhaust gas now includes 150 ppm NO and 450 ppm NO2. Exhaust gas from the DPF 20 travels to the downstream SCR 22 which is adapted to convert NO and NO2 remaining within the exhaust gas from the DPF 20 to nitrogen gas (N2) and water (H2O), as is known in the industry.

Thus, using a control strategy incorporating an NO2 based aftertreatment regeneration for removing soot build-up within the DPF 20, the exhaust system controller 26 is able to minimize thermal degradation of the system 10. However, NO2 based aftertreatment regeneration operates more slowly than traditional O2 based aftertreatment regeneration. NO2 based aftertreatment regeneration removes soot from the DPF 20 at a rate that may be less than half the rate of soot removal when using a traditional O2 based aftertreatment regeneration. This means that there may be times when a strategy incorporating an NO2 based aftertreatment regeneration of the DPF will not keep up with the rate of soot accumulation within the DPF.

In an exemplary embodiment, when the exhaust system controller 26 is performing an NO2 based aftertreatment regeneration of the DPF 20, the exhaust system controller 26 is further adapted to monitor, via communication with the delta pressure sensor 30F, a level of carbon particulate matter within the DPF 20, and to initiate a short-term O2 based aftertreatment regeneration of the DPF 20 when either one of: 1) a level of particulate matter within the DPF 20 increases during an NO2 based aftertreatment regeneration, or 2) the level of particulate matter within the DPF 20 is decreasing slower than a predetermined rate during an NO2 based aftertreatment regeneration.

Thus, the control strategy includes a back-up option for situations where operating conditions of the engine 12 are such that soot build-up within the DPF 20 is accumulating faster than an NO2 based aftertreatment regeneration can keep up with, and therefore, the exhaust system controller 26 implements a short-term O2 based aftertreatment regeneration, at correspondingly higher temperatures (five-hundred to six-hundred fifty degrees Celsius), for a short time frame, wherein carbon particulate matter within the DPF 20 is oxidized at a much faster rate and brings the level of carbon within the DPF 20 back to controllable levels, wherein the exhaust system controller 26 can switch back to the NO2 based aftertreatment regeneration. Ideally, the time frame would be limited to a few (one to five) minutes. The shorter the time frame, the less thermal deterioration of the components of the exhaust system 10. However, the exhaust system controller 26 is adapted to initiate the short-term O2 based aftertreatment regeneration for a length of time sufficient to bring the level of carbon within the DPF to controllable levels. Thus, in extreme circumstances, the time frame of the short-term O2 based aftertreatment regeneration could extend beyond a few minutes. This short-term O2 aftertreatment regeneration is only implemented for short time frames, and only in extreme situations where the NO2 based aftertreatment regeneration of the DPF 20 cannot keep up with accumulations of carbon particulate matter and the exhaust system controller 26 determines that a temporary increase in the rate of soot oxidation is necessary.

When initiating the short-term O2 based aftertreatment regeneration within the DPF 20, the exhaust system controller 26 is further adapted to increase the level of O2 within exhaust gas at the DPF inlet 44 by controlling, via communication with the engine controller 28, levels of O2 within exhaust gas from the engine 12 by selectively adjusting utilization of the EGR unit 42 within the engine 12, fresh air control and injection timing and quantity to manage the level of O2 within the exhaust gas from the engine 12. This is generally a reduction in the amount of O2, as the incoming ambient air has 21% oxygen, and the appropriate level of O2 needed for the O2 based aftertreatment regeneration is less than 21%. Control of the O2 levels within the exhaust gas is achieved primarily with fresh air control and injection timing/quantity.

In an exemplary embodiment, the exhaust system controller 26 is further adapted to establish and maintain an target exhaust gas temperature (EGT) at the inlet 44 of the DPF 20 by actively controlling, via communication with the engine controller 28, combustion characteristics of the engine 12. The DPF inlet temperature being monitored by the third temperature sensor 30C. In an exemplary embodiment, the target EGT at the inlet 44 of the DPF 20 is between approximately five-hundred degrees Celsius and approximately six-hundred fifty degrees Celsius, as discuss above, to provide sufficient temperature to sustain the chemical reaction (Equation 1) of the O2 based aftertreatment regeneration.

As discussed above, the exhaust system controller 26 is further adapted to calculate an target EGT of exhaust gas coming from the engine 12 and an EGT of exhaust gas coming from the DOC 14, working backwards, based on the target DPF inlet temperature for the O2 based aftertreatment regeneration and thermodynamic characteristics of the exhaust system 10.

For example, wherein the temperatures are non-limiting and strictly for purposes of illustration, based on the thermodynamics of the exhaust system 10, if the target target temperature within the DPF 20 (DPF inlet temperature), as measured by the third temperature sensor 30C, that is needed to support the O2 based aftertreatment regeneration is six-hundred degrees Celsius, then the temperature within the upstream SCR 16, measured by the second temperature sensor 30B, must be six-hundred fifty degrees Celsius, and the temperature within the DOC 14 (DOC inlet temperature) must be seven-hundred degrees Celsius.

In an exemplary embodiment, the exhaust system controller 26 is adapted to establish and maintain the target EGT of exhaust gas coming from the engine 12 and the target EGT of the exhaust gas coming from the DOC by selectively utilizing, via communication with the engine controller 28, late injections and post injections within the engine 12, as discussed above.

Within the DPF 20, when carbon particulate matter within the DPF is exposed to a platinum and/or palladium catalyst, the solid carbon-based particulate matter that has accumulated within the DPF 20 is converted to gaseous carbon dioxide (CO2) by using the O2 present within the exhaust gas as an oxidant for the O2 based aftertreatment regeneration.

One advantage of high-temperature, O2 based aftertreatment regeneration is that the high temperatures within the upstream SCR 16 and the downstream SCR 22 help to reduce the amount of sulfur oxides (SOx) that are absorbed and build up within the upstream SCR 16 and the downstream SCR 22. Despite the use of low-sulfur fuels and desulfurization processes, exhaust gases still contain a few parts per million (ppm) of SO2, and the presence of such trace amounts of sulfur can poison the active sites of the upstream SCR 16 and the downstream SCR 22 by forming inactive metal-sulfate species. This deactivation severely degrades the catalytic performance.

Thus, part of the control strategy for the exhaust system 10 to ensure sure that there is an occasional desorption of absorbed SOx within the upstream SCR 16 and the downstream SCR 22. If a pre-determined amount of time has passed, wherein a high-temperature, O2 based aftertreatment regeneration of the DPF has not been initiated or when an estimated level of sulfur exceeds a pre-determined threshold, the exhaust system controller 26 is further adapted to initiate a short-term SCR desulfation for desorbing SOx within at least one of the upstream SCR 16 and the downstream SCR 22.

In an exemplary embodiment, the exhaust system controller 26 is further adapted to establish and maintain an target exhaust gas temperature (EGT) at one of or both of an inlet 48 of the upstream SCR 16 and an inlet 50 of the downstream SCR 22 by actively controlling, via communication with the engine controller 28, combustion characteristics of the engine 12. The temperature of the exhaust gas at the inlet 48 of the upstream SCR 16 being monitored by the second temperature sensor 30B and the temperature of the exhaust gas at the inlet 50 of the downstream SCR 22 being monitored by the fourth temperature sensor 30D. The target EGT at the upstream SCR 16 and/or the downstream SCR 22 is the temperature that is sufficient to spontaneously cause desorption (removal) of SOx from the upstream SCR 16 and/or the downstream SCR 22 as is understood in the industry.

As discussed above, the exhaust system controller 26 is further adapted to calculate an target EGT of exhaust gas coming from the engine 12, working backwards, based on the target exhaust gas temperature (EGT) at one of or both of the inlet 48 of the upstream SCR 16 and the inlet 50 of the downstream SCR 22 for removal of SOx and thermodynamic characteristics of the exhaust system 10.

For example, wherein the temperatures are non-limiting and strictly for purposes of illustration, based on the thermodynamics of the exhaust system 10, if the target target temperature within the downstream SCR 22, as measured by the fourth temperature sensor 30D, that is needed to support the removal of SOx is five-hundred fifty degrees Celsius, then the temperature within the DPF 20, as measured by the third temperature sensor 30C, must be six-hundred degrees Celsius, and the temperature within the first SCR 16, measured by the second temperature sensor 30B, must be six-hundred fifty degrees Celsius, and the temperature within the DOC 14 (DOC inlet temperature) must be seven-hundred degrees Celsius.

In an exemplary embodiment, the exhaust system controller 26 is adapted to establish and maintain the target EGT of exhaust gas coming from the engine 12 and the target EGT of exhaust gas coming from the DOC 14 by selectively utilizing, via communication with the engine controller 28, late injections and post injections within the engine 12, as discussed above.

Thus a control strategy using the system 10 of the present disclosure includes 1) primarily using an NO2 based aftertreatment regeneration of the DPF 20 by intrusively and actively controlling EGR 42 function and combustion characteristics (injection timing, injection quantity, and fresh air quantity) within the engine 12 to achieve NO2 levels and temperatures within the exhaust gas to support the NO2 based aftertreatment regeneration, 2) occasionally, when soot reduction within the DPF 20 is ineffective during an NO2 based aftertreatment regeneration, using an O2 based aftertreatment regeneration of the DPF 20, for a short time frame, by intrusively and actively controlling EGR 42 function and combustion characteristics (injection timing, injection quantity, and fresh air quantity) within the engine 12 to achieve O2 levels and temperatures within the exhaust gas to support the O2 based aftertreatment regeneration, and 3) occasionally, when no recent O2 based aftertreatment regeneration has been initiated, using an SCR desulfation of one or both of the upstream and downstream SCR 16, 22, to remove SOx from one or both of the upstream and downstream SCR 16, 22 by intrusively and actively controlling EGR function and combustion characteristics (injection timing, injection quantity, and fresh air quantity) within the engine 12 to achieve O2 levels and temperatures within the exhaust gas to support SOx desorption within one or both of the upstream and downstream SCR 16, 22.

Figure 2:
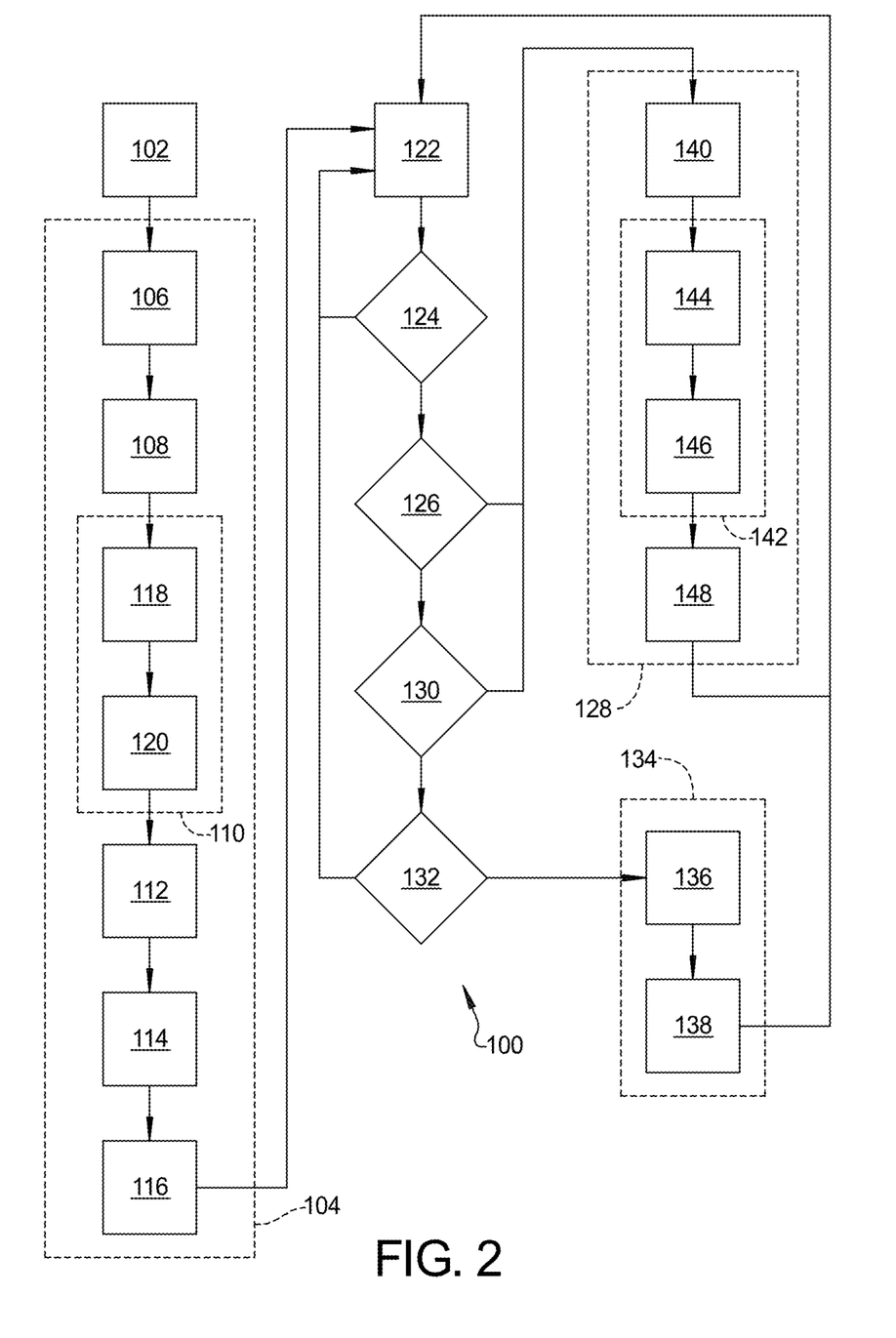
FIG. 2 is a flow chart illustrating a method according to an exemplary embodiment of the present disclosure.

Referring to FIG. 2, a method 100 of aftertreatment regeneration in a diesel vehicle includes, starting at block 102, routing exhaust gases from a diesel engine 12 through an exhaust system 10 within the vehicle, the exhaust system 10 including a diesel oxidizing catalyst (DOC) 14 located immediately downstream of the diesel engine 12, a first selective catalytic reduction (SCR) 16 unit located downstream of the DOC 14, a first diesel exhaust fluid (DEF) injector 18 positioned between the DOC 14 and the upstream SCR 16 and adapted to inject DEF into the exhaust gas, a diesel particulate filter (DPF) 20 positioned downstream of the upstream SCR 16 and adapted to collect particulate material from exhaust gas passing therethrough, a downstream SCR 22 unit located downstream of the DPF 20, a second DEF injector 24 positioned between the DPF 20 and the downstream SCR 22 and adapted to inject DEF into the exhaust gas, and an exhaust system controller 26 in communication with an engine controller 28, a plurality of sensors 30A-30F within the exhaust system 10 and the first and second DEF injectors 18, 24.

Moving to block 104, the method 100 further includes initiating a nitrogen dioxide (NO2) based aftertreatment regeneration of the DPF 20 by, moving to block 106, at least partially de-activating, with the exhaust system controller, the first DEF injector 18 and the upstream SCR 16, such that NO2 is allowed to pass through the upstream SCR 16, moving to block 108, increasing, with the exhaust system controller 26 via communication with the engine controller 28, levels of Nitric Oxide (NO) within exhaust gas from the engine 12, moving to block 110, establishing and maintaining an target exhaust gas temperature (EGT) at an inlet 44 of the DPF 20 (DPF inlet temperature) and an target EGT at an inlet 46 of the DOC 14 (DOC inlet temperature) by actively controlling, with the exhaust system controller 26, via communication with the engine controller 28, combustion characteristics of the engine 12, moving to block 112, converting, with the DOC 14, NO within the exhaust gas entering the DOC 14 to NO2, moving to block 114, converting solid carbon-based particulate matter that has accumulated within the DPF 20 to gaseous carbon dioxide (CO2) and NO by using NO2 as an oxidant, and, moving to block 116, converting, within the downstream SCR 22, NO and NO2 within exhaust gas from the DPF 20 to nitrogen gas (N2) and water (H2O).

In an exemplary embodiment, the increasing, with the exhaust system controller 26 via communication with the engine controller 28, levels of NO within exhaust gas from the engine 12 at block 108, further includes selectively adjusting utilization, with the exhaust system controller 26, via communication with the engine controller 28, of an exhaust gas recirculation (EGR) unit 42, injection timing, injection quantity, and fresh air quantity within the engine 12.

In an exemplary embodiment, the establishing and maintaining an target exhaust gas temperature (EGT) at the inlet 44 of the DPF 20 and an target EGT at the inlet 46 of the DOC 14 by actively controlling, with the exhaust system controller 26, via communication with the engine controller 28, combustion characteristics of the engine 12 at block 110, further includes, moving to block 118, calculating, an target EGT of exhaust gas coming from the engine 12 and an target EGT of exhaust gas coming from the DOC 14 based on the target DPF inlet temperature and thermodynamic characteristics of the exhaust system 10, and, moving to block 120, establishing and maintaining the target EGT of exhaust gas coming from the engine 12 and the target EGT of exhaust gas coming from the DOC 14 by selectively utilizing, with the exhaust system controller 26, via communication with the engine controller 28, late injections and post injections within the engine 12.

In an exemplary embodiment, the establishing and maintaining an target exhaust gas temperature (EGT) at the inlet 44 of the DPF 20 at block 110 further includes establishing and maintaining the DPF inlet temperature of as low as three-hundred degrees Celsius (between approximately three-hundred degrees Celsius and approximately five-hundred degrees Celsius).

In an exemplary embodiment, the converting, with the DOC 14, NO within the exhaust gas entering the DOC 14 to NO2 at block 112 further includes, converting, with the DOC 14, using platinum as a catalyst, approximately fifty percent of the NO within the exhaust gas entering the DOC 14 to NO2.

In an exemplary embodiment, the at least partially de-activating, with the exhaust system controller, the first DEF injector 18 and the upstream SCR 16, such that NO2 is allowed to pass through the upstream SCR 16 at block 106 further includes, prior to the increasing levels of NO within exhaust gas from the engine 12 at block 108, and prior to establishing and maintaining an target DPF 20 inlet temperature and an target DOC 14 inlet temperature AT Block 110, and prior to converting, with the DOC 14, NO within the exhaust gas entering the DOC 14 to NO2 at block 112, at least partially de-activating, with the exhaust system controller 26, the first DEF injector 18, and allowing residual DEF within the upstream SCR 16 to dissipate.

In an exemplary embodiment, the converting (oxidizing) solid carbon-based particulate matter that has accumulated within the DPF 20 to gaseous carbon dioxide (CO2) and NO by using NO2 as a oxidant at block 114 further includes exposing carbon particulate matter within the DPF 20 to a platinum and/or palladium catalyst, wherein, the carbon particulate matter and the NO2 react to form CO2 and NO, and further wherein, the NO reacts with oxygen (O2) to form NO2, wherein the newly formed NO2 further reacts with carbon particulate matter.

In an exemplary embodiment the method 100 further includes, moving to block 122, monitoring, with the exhaust system controller 26, via communication with a delta pressure sensor 30F, a level of carbon particulate matter within the DPF 20, and moving to block 124, if the exhaust system is not currently running an NO2 based aftertreatment regeneration, reverting back to block 122, and if the exhaust system is currently running an NO2 based aftertreatment regeneration, moving to block 126.

At block 126, if a level of particulate matter within the DPF 20 increases during the NO2 based aftertreatment regeneration, then moving to block 128, the method 100 includes initiating a short-term O2 based aftertreatment regeneration of the DPF 20. At block 126, if the level of particulate matter within the DPF 20 does not increase during the NO2 based aftertreatment regeneration, the method 100 includes moving to block 130.

At block 130, if the level of particulate matter within the DPF is decreasing slower than a predetermined rate during the NO2 based aftertreatment regeneration, then moving to block 128, the method 100 includes initiating a short-term O2 based aftertreatment regeneration of the DPF 20. At block 130, if the level of particulate matter within the DPF is not decreasing slower than a predetermined rate during the NO2 based aftertreatment regeneration, then the method 100 includes moving to block 132.

At block 128, the initiating a short-term O2 based aftertreatment regeneration of the DPF 20 further includes, moving to block 140, increasing the level of O2 within exhaust gas at the DPF inlet 44 by controlling, with the exhaust system controller 26 via communication with the engine controller 28, levels of O2 within exhaust gas from the engine 12 by selectively adjusting utilization, with the exhaust system controller 26, via communication with the engine controller 28, of the EGR unit 42, injection timing, injection quantity, and fresh air quantity within the engine 12, moving to block 142, establishing and maintaining a desired EGT of between approximately five-hundred degrees Celsius and six-hundred and fifty degrees Celsius at the inlet 44 of the DPF 20 by, moving to block 144, calculating, an target EGT of exhaust gas coming from the engine 12 and an target EGT of exhaust gas coming from the DOC 14 based on the desired EGT at the DPF inlet 44 and the thermodynamic characteristics of the exhaust system 10, and, moving to block 146, establishing and maintaining the target EGT of exhaust gas coming from the engine 12 and the target EGT of exhaust gas coming from the DOC 14 by actively controlling, with the exhaust system controller 26, via communication with the engine controller 28, combustion characteristics of the engine 12 and selectively utilizing, with the exhaust system controller 26, via communication with the engine controller 28, late injections and post injections within the engine 12. Moving to block 148, the method further includes converting solid carbon-based particulate matter that has accumulated within the DPF 20 to gaseous CO2 by using O2 as a oxidant.

At block 132, if a pre-determined time window has not passed since the exhaust system controller 26 has initiated a short-term O2 based aftertreatment regeneration or if estimated sulfur levels exceed a pre-determined threshold, then the method 100 reverts back to block 122. If, at block 132, a pre-determined time window has passed since the exhaust system controller 26 has initiated a short-term O2 based aftertreatment regeneration, then, moving to block 134, the method 100 further includes initiating a short-term SCR desulfation and desorbing sulfur oxides (SOx) within at least one of the upstream SCR 16 and the downstream SCR 22.

In an exemplary embodiment, the initiating a short-term SCR desulfation and desorbing sulfur oxides (SOx) within at least one of the upstream SCR 16 and the downstream SCR 22 at block 134 further includes establishing and maintaining an target desorbing EGT within at least one of an inlet 48 of the upstream SCR 16 and an inlet 50 of the downstream SCR 22 by, moving to block 136, calculating, an target EGT of exhaust gas coming from the engine 12 and an target EGT of exhaust gas coming from the DOC 14 based on the target desorbing EGT and the thermodynamic characteristics of the exhaust system 10, and, moving to block 138, establishing and maintaining the target EGT of exhaust gas coming from the engine 12 and the target EGT of exhaust gas coming from the DOC 14 by actively controlling, with the exhaust system controller 26, via communication with the engine controller 28, combustion characteristics of the engine 12 and selectively utilizing, with the exhaust system controller 26, via communication with the engine controller 28, late injections and post injections within the engine 12.

A system and method of the present disclosure offers the advantage of providing a control strategy for performing aftertreatment regenerations within an diesel exhaust system 10, including 1) primarily using an NO2 based aftertreatment regeneration of the DPF 20 by intrusively and actively controlling EGR 42 function and combustions characteristics within the engine 12 to achieve NO2 levels and temperatures within the exhaust gas to support the NO2 based aftertreatment regeneration, 2) occasionally, when soot reduction within the DPF 20 is ineffective during an NO2 based aftertreatment regeneration, using an O2 based aftertreatment regeneration of the DPF 20, for a short time frame, by intrusively and actively controlling EGR 42 function and combustions characteristics (injection timing, injection quantity, and fresh air quantity) within the engine 12 to achieve O2 levels and temperatures within the exhaust gas to support the O2 based aftertreatment regeneration, and 3) occasionally, when no recent O2 based aftertreatment regeneration has been initiated, using an SCR desulfation of one or both of the upstream and downstream SCR 16, 22, to remove SOx from one or both of the upstream and downstream SCR 16, 22 by intrusively and actively controlling EGR function and combustion characteristics (injection timing, injection quantity, and fresh air quantity) within the engine 12 to achieve O2 levels and temperatures within the exhaust gas to support SOx desorption within one or both of the upstream and downstream SCR 16, 22.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of aftertreatment regeneration in a diesel vehicle, comprising:
routing exhaust gases from a diesel engine through an exhaust system within the vehicle, the exhaust system including:
a diesel oxidizing catalyst (DOC) located immediately downstream of the diesel engine;
an upstream selective catalytic reduction (SCR) unit located downstream of the DOC;
a first diesel exhaust fluid (DEF) injector positioned between the DOC and the first SCR and adapted to inject DEF into the exhaust gas;
a diesel particulate filter (DPF) positioned downstream of the first SCR and adapted to collect particulate material from exhaust gas passing therethrough; and
an exhaust system controller in communication with an engine controller, a plurality of sensors within the exhaust system and the first DEF injector; and
initiating a nitrogen dioxide (NO2) based aftertreatment regeneration of the DPF by:

at least partially de-activating, with the exhaust system controller, the first DEF injector and the upstream SCR, such that NO2 is allowed to pass through the upstream SCR;

increasing, with the exhaust system controller via communication with the engine controller, levels of Nitric Oxide (NO) within exhaust gas from the engine;

establishing and maintaining an target exhaust gas temperature (EGT) at an inlet of the DPF (DPF inlet temperature) and an target EGT at an inlet of the DOC (DOC inlet temperature) by actively controlling, with the exhaust system controller, via communication with the engine controller, combustion characteristics of the engine;

converting, with the DOC, NO within the exhaust gas entering the DOC to NO2; and converting solid carbon-based particulate matter that has accumulated within the DPF to gaseous carbon dioxide (CO2) and NO by using NO2 as an oxidant.

2. The method of claim 1, wherein the increasing, with the exhaust system controller via communication with the engine controller, levels of NO within exhaust gas from the engine further includes selectively adjusting utilization, with the exhaust system controller, via communication with the engine controller, of an exhaust gas recirculation (EGR) unit, injection timing, injection quantity, and fresh air quantity within the engine.

3. The method of claim 2, wherein the establishing and maintaining an target exhaust gas temperature (EGT) at an inlet of the DPF (DPF inlet temperature) and an target EGT at an inlet of the DOC (DOC inlet temperature) by actively controlling, with the exhaust system controller, via communication with the engine controller, combustion characteristics of the engine further includes:

calculating, an target EGT of exhaust gas coming from the engine based on the target DPF inlet temperature and the target DOC inlet temperature and thermodynamic characteristics of the exhaust system; and establishing and maintaining the target EGT of exhaust gas coming from the engine and the target EGT of exhaust gas coming from the DOC by selectively utilizing, with the exhaust system controller, via communication with the engine controller, late injections and post injections within the engine.

4. The method of claim 3, wherein the establishing and maintaining an target exhaust gas temperature (EGT) at an inlet of the DPF (DPF inlet temperature) further includes establishing and maintaining the DPF inlet temperature between approximately three-hundred degrees Celsius and approximately five-hundred degrees Celsius.

5. The method of claim 4, wherein the converting, with the DOC, NO within the exhaust gas entering the DOC to NO2 further includes, converting, with the DOC, using platinum as a catalyst, NO within the exhaust gas entering the DOC to NO2.

6. The method of claim 5, wherein the at least partially de-activating, with the exhaust system controller, the first DEF injector and the upstream SCR, such that NO2 is allowed to pass through the upstream SCR further includes, prior to the increasing levels of NO within exhaust gas from the engine, establishing and maintaining an target DPF inlet temperature and an target DOC inlet temperature, and converting, with the DOC, NO within the exhaust gas entering the DOC to NO2:

at least partially de-activating, with the exhaust system controller, the first DEF injector; and allowing residual DEF within the upstream SCR to dissipate to acceptable levels.

7. The method of claim 6, wherein the converting solid carbon-based particulate matter that has accumulated within the DPF to gaseous carbon dioxide (CO2) and NO by using NO2 as an oxidant further includes:

exposing carbon particulate matter within the DPF to at least one of a platinum and a palladium catalyst, wherein, the carbon particulate matter and the NO2 react to form CO2 and NO, and further wherein, the NO reacts with oxygen (O2) to form NO2, wherein the newly formed NO2 further reacts with carbon particulate matter.

8. The method of claim 7, further including:

monitoring, with the exhaust system controller, via communication with a delta pressure sensor and a temperature of the exhaust gas within the DPF, a level of carbon particulate matter within the DPF; and initiating a short-term O2 based aftertreatment regeneration of the DPF when one of:

a level of particulate matter within the DPF increases during an NO2 based aftertreatment regeneration; or the level of particulate matter within the DPF is decreasing slower than a predetermined rate during an NO2 based aftertreatment regeneration.

9. The method of claim 8, wherein the initiating a short term O2 based aftertreatment regeneration of the DPF further includes:

managing the level of O2 within exhaust gas at the DPF inlet by controlling, with the exhaust system controller via communication with the engine controller, levels of O2 within exhaust gas from the engine by selectively adjusting utilization, with the exhaust system controller, via communication with the engine controller, of the EGR unit, injection timing, injection quantity, and fresh air quantity within the engine;

establishing and maintaining a desired EGT of between approximately five-hundred degrees Celsius and six-hundred and fifty degrees Celsius at the inlet of the DPF by:

calculating, an target EGT of exhaust gas coming from the engine and an target EGT of exhaust gas coming from the DOC based on the desired EGT at the DPF inlet and the thermodynamic characteristics of the exhaust system; and establishing and maintaining the target EGT of exhaust gas coming from the engine and the target EGT of exhaust gas coming from the DOC by actively controlling, with the exhaust system controller, via communication with the engine controller, combustion characteristics of the engine and selectively utilizing, with the exhaust system controller, via communication with the engine controller, late injections and post injections within the engine; and converting solid carbon-based particulate matter that has accumulated within the DPF to gaseous CO2 by using O2 as an oxidant.

10. The method of claim 9, further including initiating a short-term SCR desulfation and desorbing sulfur oxides (SOx) within the upstream SCR, the short-term SCR desulfation including:

establishing and maintaining an target desorbing EGT at an inlet of the upstream SCR by:

calculating, an target EGT of exhaust gas coming from the engine and an target EGT of exhaust gas coming from the DOC based on the target desorbing EGT and the thermodynamic characteristics of the exhaust system; and establishing and maintaining the target EGT of exhaust gas coming from the engine and the target EGT of exhaust gas coming from the DOC by actively controlling, with the exhaust system controller, via communication with the engine controller, combustion characteristics of the engine and selectively utilizing, with the exhaust system controller, via communication with the engine controller, late injections and post injections within the engine.

11. An exhaust system for a vehicle having a diesel engine, comprising:
   a diesel oxidizing catalyst (DOC) located immediately downstream of the diesel engine;
   an upstream selective catalytic reduction (SCR) unit located downstream of the DOC;
   a first diesel exhaust fluid (DEF) injector positioned between the DOC and the upstream SCR and adapted to inject DEF into the exhaust gas;
   a diesel particulate filter (DPF) positioned downstream of the upstream SCR and adapted to collect particulate material from exhaust gas passing therethrough; and
   an exhaust system controller in communication with an engine controller, a plurality of sensors within the exhaust system and the first DEF injector; and
   wherein, the exhaust system controller is adapted to initiate a nitrogen dioxide (NO2) based aftertreatment regeneration of the DPF, wherein the exhaust system controller is adapted to:
      at least partially de-activate the first DEF injector and the upstream SCR, such that NO2 is allowed to pass through the upstream SCR;
      increase, via communication with the engine controller, levels of Nitric Oxide (NO) within exhaust gas from the engine;
      establish and maintaining an target exhaust gas temperature (EGT) at an inlet of the DPF (DPF inlet temperature) and an target EGT at an inlet of the DOC (DOC inlet temperature) by actively controlling, via communication with the engine controller, combustion characteristics of the engine;
   wherein, the DOC is adapted to convert NO within the exhaust gas entering the DOC to NO2, solid carbon-based particulate matter that has accumulated within the DPF is converted to gaseous carbon dioxide (CO2) and NO by using NO2 as an oxidant.

12. The exhaust system of claim 11, wherein to increase levels of NO within exhaust gas from the engine, the exhaust system controller is further adapted to, via communication with the engine controller, selectively adjust utilization of an exhaust gas recirculation (EGR) unit, injection timing, injection quantity, and fresh air quantity within the engine.

13. The exhaust system of claim 12, wherein to establish and maintaining an target exhaust gas temperature (EGT) at the inlet of the DPF and an target EGT at the inlet of the DOC, the exhaust system controller is further adapted to:
   calculate an target EGT of exhaust gas coming from the engine and an target EGT of exhaust gas coming from the DOC based on the target DPF inlet temperature thermodynamic characteristics of the exhaust system; and
   establish and maintain the target EGT of exhaust gas coming from the engine and the target EGT of exhaust gas coming from the DOC by selectively utilizing, via communication with the engine controller, late injections and post injections within the engine; and
   wherein the target EGT at the inlet of the DPF is between approximately three-hundred degrees Celsius and approximately five-hundred degrees Celsius.

14. The exhaust system of claim 13, wherein the DOC includes a platinum catalyst and is adapted to convert NO within the exhaust gas entering the DOC to NO2.

15. The exhaust system of claim 14, wherein to at least partially de-activate the first DEF injector and the upstream SCR, such that NO2 is allowed to pass through the upstream SCR, the exhaust system controller is further adapted to, prior to increasing levels of NO within exhaust gas from the engine, establishing and maintaining the target DPF inlet temperature and the target DOC inlet temperature, and conversion, within the DOC, NO within the exhaust gas entering the DOC to NO2:
   at least partially de-activate the first DEF injector; and
   allow residual DEF within the upstream SCR to dissipate.

16. The exhaust system of claim 15, wherein the DPF includes at least one of a platinum and a palladium catalyst, wherein when carbon particulate matter within the DPF is exposed to the at least one of platinum and palladium catalyst, the carbon particulate matter and the NO2 react to form CO2 and NO, and the NO reacts with oxygen (O2) to form NO2, wherein the newly formed NO2 further reacts with carbon particulate matter.

17. The exhaust system of claim 16, wherein the exhaust system controller is further adapted to:
   monitor, via communication with a delta pressure sensor and input from temperature sensors within the system, a level of carbon particulate matter within the DPF; and
   initiate a short-term O2 based aftertreatment regeneration of the DPF when one of:
      a level of particulate matter within the DPF increases during an NO2 based aftertreatment regeneration; or
      the level of particulate matter within the DPF is decreasing slower than a predetermined rate during an NO2 based aftertreatment regeneration.

18. The exhaust system of claim 17, wherein when initiating a short term O2 based aftertreatment regeneration of the DPF, the exhaust system controller is further adapted to:
   manage the level of O2 within exhaust gas at the DPF inlet by controlling, via communication with the engine controller, levels of O2 within exhaust gas from the engine by selectively adjusting utilization of the EGR unit, injection timing, injection quantity, and fresh air quantity within the engine;
   calculate an target EGT of exhaust gas coming from the engine and an target EGT of exhaust gas coming from DOC based on a desired EGT at the DPF inlet of between approximately five-hundred degrees Celsius and six-hundred and fifty degrees Celsius and the thermodynamic characteristics of the exhaust system; and
   utilize, via communication with the engine controller, selective late injections and post injections within the engine to actively control combustion characteristics of the engine to establish and maintain the target EGT of exhaust gas coming from the engine and the target EGT of exhaust gas coming from DOC; and
   wherein, solid carbon-based particulate matter that has accumulated within the DPF is converted to gaseous CO2 by using O2 as a reductant.

19. The exhaust system of claim 18, wherein the exhaust system controller is further adapted to initiate a short-term SCR desulfation for desorbing sulfur oxides (SOx) within the upstream SCR, wherein the exhaust system controller is adapted to:
  calculate an target EGT of exhaust gas coming from the engine and an target EGT of exhaust gas coming from DOC based on an target desorbing EGT at an inlet of the upstream SCR and the thermodynamic characteristics of the exhaust system;
  actively control, via communication with the engine controller, combustion characteristics of the engine and selectively utilize late injections and post injections within the engine to establish and maintain the target desorbing EGT at the inlet of the upstream SCR.

20. A method of aftertreatment regeneration in a diesel vehicle, comprising:
  routing exhaust gases from a diesel engine through an exhaust system within the vehicle, the exhaust system including:
    a diesel oxidizing catalyst (DOC) located immediately downstream of the diesel engine;
    an upstream selective catalytic reduction (SCR) unit located downstream of the DOC;
    a first diesel exhaust fluid (DEF) injector positioned between the DOC and the upstream SCR and adapted to inject DEF into the exhaust gas;
    a diesel particulate filter (DPF) positioned downstream of the upstream SCR and adapted to collect particulate material from exhaust gas passing therethrough; and
    an exhaust system controller in communication with an engine controller, a plurality of sensors within the exhaust system and the first DEF injector; and
  initiating a nitrogen dioxide (NO2) based aftertreatment regeneration of the DPF by:
    at least partially de-activating, with the exhaust system controller, the first DEF injector and allowing residual DEF within the upstream SCR to dissipate, such that NO2 is allowed to pass through the upstream SCR;
    selectively adjusting utilization, with the exhaust system controller, via communication with the engine controller, of an exhaust gas recirculation (EGR) unit, injection timing, injection quantity, and fresh air quantity within the engine and increasing levels of Nitric Oxide (NO) within exhaust gas from the engine;
    calculating, an target EGT of exhaust gas coming from the engine and an target EGT of exhaust gas coming from the DOC based on an target exhaust gas temperature (EGT) at an inlet of the DPF (DPF inlet temperature) and thermodynamic characteristics of the exhaust system;
    actively controlling, with the exhaust system controller, via communication with the engine controller, combustion characteristics of the engine by selectively utilizing late injections and post injections within the engine and establishing and maintaining the target EGT of exhaust gas coming from the engine and the target EGT at an inlet of the DOC (DOC inlet temperature) and establishing and maintaining the DPF inlet temperature between approximately three-hundred degrees Celsius and approximately four-hundred degrees Celsius;
    converting, with the DOC, using platinum as a catalyst, NO within the exhaust gas entering the DOC to NO2; and
    exposing carbon particulate matter within the DPF to at least one of a platinum catalyst and a palladium catalyst, wherein, the carbon particulate matter and the NO2 react to form gaseous carbon dioxide (CO2) and NO, and further wherein, the NO reacts with oxygen (O2) to form NO2, wherein the newly formed NO2 further reacts with carbon particulate matter;
  monitoring, with the exhaust system controller, via communication with a delta pressure sensor and input from temperature sensors, a level of carbon particulate matter within the DPF; and
  initiating a short-term O2 based aftertreatment regeneration of the DPF when one of:
    a level of particulate matter within the DPF increases during the NO2 based aftertreatment regeneration; or
    the level of particulate matter within the DPF is decreasing slower than a predetermined rate during the NO2 based aftertreatment regeneration;
  wherein the initiating a short term O2 based aftertreatment regeneration of the DPF further includes:
    managing the level of O2 within exhaust gas at the DPF inlet by controlling, with the exhaust system controller via communication with the engine controller, levels of O2 within exhaust gas from the engine by selectively adjusting utilization, with the exhaust system controller, via communication with the engine controller, of the EGR unit, injection timing, injection quantity, and fresh air quantity within the engine;
    establishing and maintaining a desired EGT of between approximately five-hundred degrees Celsius and six-hundred and fifty degrees Celsius at the inlet of the DPF by:
      calculating, an target EGT of exhaust gas coming from the engine and an target EGT of exhaust gas coming from the DOC based on the desired EGT at the DPF inlet and the thermodynamic characteristics of the exhaust system; and
      establishing and maintaining the target EGT of exhaust gas coming from the engine and the target EGT of exhaust gas coming from the DOC by actively controlling, with the exhaust system controller, via communication with the engine controller, combustion characteristics of the engine and selectively utilizing, with the exhaust system controller, via communication with the engine controller, late injections and post injections within the engine; and
    converting solid carbon-based particulate matter that has accumulated within the DPF to gaseous CO2 by using O2 as an oxidant; and
  selectively initiating a short-term SCR desulfation and desorbing sulfur oxides (SOx) within the upstream SCR, the short-term SCR desulfation including:
    establishing and maintaining an target desorbing EGT at an inlet of the upstream SCR by:
      calculating, an target EGT of exhaust gas coming from the engine and an target EGT of exhaust gas coming from the DOC based on the target desorbing EGT and the thermodynamic characteristics of the exhaust system; and
      establishing and maintaining the target EGT of exhaust gas coming from the engine and the target EGT of exhaust gas coming from the DOC by actively controlling, with the controller, via communication with the engine controller, combustion characteristics of the engine and selectively utilizing, with the exhaust system controller, via communication with the engine controller, late injections and post injections within the engine.

* * * * *